Oct. 8, 1963 G. C. STANLEY, JR 3,106,685

SWEEP OSCILLATOR POWER LEVELER

Filed Oct. 27, 1960

INVENTOR
GEORGE C. STANLEY, JR.
BY
ATTORNEY

United States Patent Office 3,106,685

Patented Oct. 8, 1963

3,106,685

SWEEP OSCILLATOR POWER LEVELER

George C. Stanley, Jr., Los Altos, Calif., assignor to Hewlett-Packard Company, Palo Alto, Calif., a corporation of California Filed Oct. 27, 1960, Ser. No. 65,475
2 Claims. (Cl. 328—142)

Figure 1:
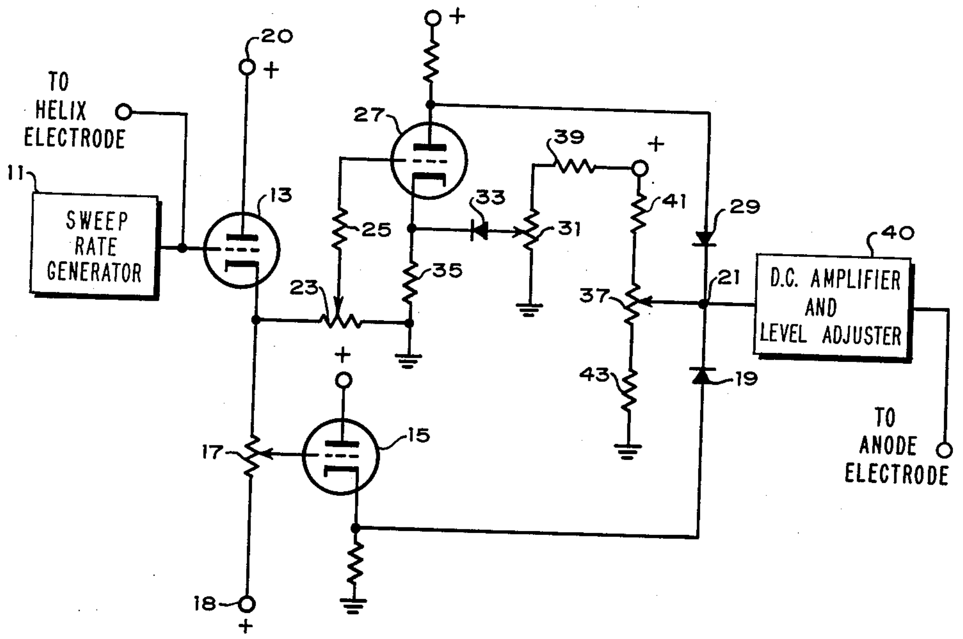

This invention relates to microwave frequency power levelers and more particularly to a circuit for controlling the voltage applied to the anode of a backward wave oscillator tube which is used to generate frequencies within a selected band at a predetermined sweep rate.

Certain microwave devices operate at very high frequencies of the order of one to twenty kilomegacycles per second. Various schemes, including the use of a backward wave oscillator tube for producing such high frequencies, are known in the art. The backward wave oscillator tube comprises cathode, grid, anode and helix electrodes assembled in an evacuated glass envelope, and is designed to produce microwave frequencies that can be voltage tuned over bandwidths from one and one-half to one to as high as five to one. The operating frequency of the oscillator is determined by the voltage applied to the helix and varies substantially as an exponential function of the voltage applied thereto. The power available at the output of the oscillator is determined by the voltage applied to the anode with respect to the cathode. A more detailed description of the design principles and theory of operation of the backward wave oscillator is provided in United States Patent No. 2,880,355 issued on March 31, 1959, to B. Epsztein, and in United States Patent No. 2,932,760 issued on April 12, 1960, to B. Epsztein.

For a constant voltage applied to the anode electrode, the output power produced by a backward wave oscillator tube over the band of operating frequencies is generally not constant. When the oscillator is operated at a given frequency, the output power may be adjusted to the desired level simply by manually adjusting the voltage applied to the anode. And when the frequency of operation is changed to another value, the power output may be adjusted to substantially the same level by manually readjusting the voltage applied to the anode. However, when the oscillator sweeps a band of frequencies, as when used in testing equipment, it becomes exceedingly difficult to maintain the output power at a substantially constant level by manually adjusting the anode voltage. It is desirable, when the oscillator sweeps an entire band of frequencies, to maintain the output power at a substantially constant level for all frequencies. This can be achieved by automatically varying the voltage applied to the anode as a function of the operating frequency. In this manner, the oscillator may be repeatedly swept through a band of frequencies and yield a constant output power level.

Accordingly, it is an object of the present invention to provide a circuit which will reduce the variation in the output power of a backward wave oscillator over the band of operating frequencies.

It is another object of the present invention to provide a circuit which will automatically adjust the voltage applied to the anode of a backward wave oscillator tube to provide minimum variation in output power over the band of operating frequencies.

It is a further object of the present invention to provide a circuit which will produce a correcting voltage for application to the anode of a backward wave oscillator tube, this correcting voltage having a plurality of slopes and break points which can be varied to obtain a minimum variation in output power for a given tube.

In accordance with the illustrated embodiment of the present invention, a voltage decreasing exponentially with time is applied to a wave shaping circuit which provides a waveform containing a plurality of segments having different and controllable slopes. The waveform thus produced is amplified and elevated to a potential suitable for application to the anode of the backward wave oscillator tube.

Figure 2:
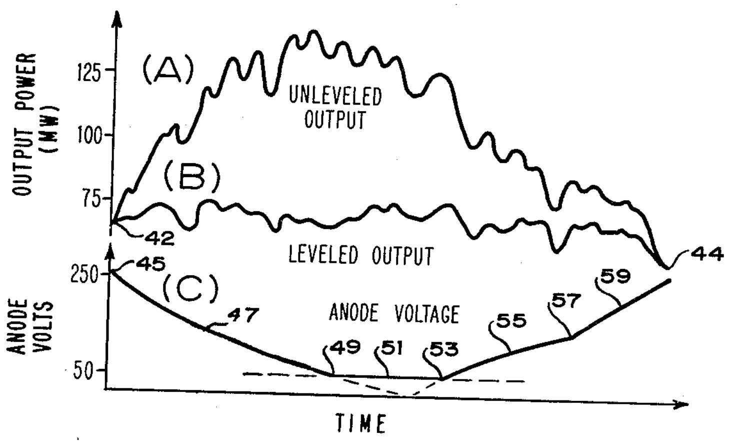

Other and incidental objects of the present invention will be apparent from a reading of this specification and an inspection of the accompanying drawing in which:

FIGURE 1 is a schematic diagram of the power leveler circuit according to the present invention, and FIGURE 2 is a graph showing the anode voltage waveform and its effect upon the output power of a typical backward wave oscillator tube.

Referring now to FIGURE 1, the output of sweep rate generator 11 is shown connected to the helix electrode and to the input grid of cathode follower 13. The grid of cathode follower 15 is connected to the variable tap of cathode resistor 17. The output of cathode follower 15 is connected through diode 19 to node 21. Adjustable resistor 23 is connected to the output of cathode follower 13, the variable tap of which is connected through resistor 25 to the input of amplifier 27. The output of amplifier 27 is connected through diode 29 to node 21. The variable tap of resistor 31 is connected through diode 33 to the cathode resistor 35 of amplifier 27, and the variable tap of resistor 37 is connected to node 21. Direct current amplifier and level adjuster 40 is connected between node 21 and the anode of the backward wave oscillator tube. Serially connected resistors 31 and 39 comprise a voltage divider between a positive polarity voltage and ground, and serially connected resistors 37, 41 and 43 comprise a voltage divider between the positive supply voltage and ground.

The frequency of the backward wave oscillator is controlled by the voltage applied to the helix circuit from sweep rate generator 11. A low helix voltage corresponds to low frequency of oscillation, and high helix voltage corresponds to high frequency of oscillation. The output voltage of sweep rate generator 11, which is applied to the helix circuit and to the input grid of cathode follower 13, is a voltage that decays exponentially with time. A variable voltage divider or signal attenuator is provided by the adjustable tap of resistor 17. Power supply voltage 18 which is applied to resistor 17 is chosen to be substantially equal to the output voltage of generator 11 at the start of the sweep cycle. Power supply voltage 20, then, is chosen sufficiently high to provide plate voltage for cathode follower 13 at the start of the sweep. The portion of the output voltage of cathode follower 13 appearing on the adjustable tap of resistor 17 is applied to cathode follower 15, the output of which is connected to node 21 through diode 19. At the start of a sweep cycle, the voltage of the output of sweep rate generator 11 is at its highest value. The voltage appearing at the output terminal of cathode follower 15, then, is equal to the output voltage of generator 11 for any setting of the adjustable tap on resistor 17 and is higher than the voltage at node 21. Diode 19 is thus rendered conductive. At the same time, a portion of the voltage appearing at the output of cathode follower 13 is applied through resistors 23 and 25 to amplifier 27. This causes the voltage appearing at the output of amplifier 27 to be at its lowest value, and the voltage appearing across cathode resistor 35 to be at its highest value. Diodes 33 and 29 are thus rendered non-conductive.

As the sweep cycle progresses, the voltage at the output of sweep rate generator 11 decays exponentially, and the waveform appearing at node 21 maintains proportionality to the waveform appearing at the output of sweep rate generator 11 as a result of the voltage division provided by resistor 17. The slope of the waveform at the beginning of the sweep cycle, then, is determined by the voltage division across the adjustable tap of resistor 17. At the instant when the voltage at the output of cathode follower 15 has decayed to a value just less than the voltage appearing at node 21, as established by the voltage divider comprising resistors 37, 41 and 43, diode 19 opens and the waveform at node 21 continues substantially as a straight line with time. The level at which the slope of the waveform changes abruptly is thus determined by the position of the adjustable tap on resistor 37. Diode 29 is held cut off since the voltage at the output of amplifier 27 is substantially less than the voltage appearing at node 21. Resistor 25 serves to limit the grid current through amplifier 27 during the time when the voltage applied thereto is very high.

Another voltage divider is provided by the adjustable tap resistor or potentiometer 23. The portion of the exponentially decaying waveform appearing on the adjustable tap of resistor 23 which is applied to the input of amplifier 27 is inverted and thus appears as an exponentially increasing voltage at the output of amplifier 27. At the instant when the voltage appearing at the output of amplifier 27 is substantially equal to the voltage at node 21, diode 29 becomes conductive. Thus, the waveform appearing at node 21 is the inverse of the waveform applied to amplifier 27, which waveform is proportional to the waveform appearing on the adjustable tap of resistor 23. The slope of the waveform appearing at the output of amplifier 27, then, is determined by the voltage division across the adjustable tap of resistor 23 and by the gain of amplifier 27.

When the voltage applied to amplifier 27 is substantially equal to the voltage set by the divider comprising resistor 39 and variable resistor 31, diode 33 becomes conductive. The equivalent resistance of the voltage divider comprising resistors 31 and 39 thus added in shunt with resistor 35 through conducting diode 33 increases the gain of amplifier 27. The turning on of diode 33 causes the waveform appearing at node 21 to abruptly increase in slope. The level at which the abrupt change takes place is determined by the setting of the adjustable tap on resistor 31.

The waveform appearing at node 21, which is substantially similar to the waveform shown in FIGURE 2C, is then amplified and set to the proper level by D.-C. amplifier and level adjuster 40 for application to the anode of the backward wave oscillator tube. The D.-C. amplifier and level adjuster 40 comprises an amplifier of the grounded grid configuration commonly known in the art, wherein the grid is connected to a variable voltage source instead of to ground.

Referring now to FIGURE 2, which shows the various waveforms of the backward wave oscillator in operation, FIGURE 2A is a graph showing the unleveled variations in output power over the band as a function of frequency. At the start of the sweep 42, power is delivered at the highest frequency of oscillation, say two kilomegacycles per second. The highest frequency corresponds to the highest sweep rate voltage applied to the helix of the backward wave oscillator tube. At the end of the sweep 44, power is delivered at the lowest frequency of oscillation, say one kilomegacycle second, which frequency corresponds to the lowest sweep rate voltage applied to the helix. Small, frequent perturbations in power across the band, known as fine grain power variations, are characteristic of the particular tube used, and are generally kept within specified limits by the manufacturer. The large, cyclic variation in output power over the band is largely dependent upon the anode voltage.

FIGURE 2B shows the output power for the backward wave oscillator over the band of operating frequencies which is leveled in accordance with the present invention. The fine grain power variations remain substantially the same as in the unleveled case since they are characteristic of the particular tube used and are independent of the anode voltage. Thus, the total variation in output power over the entire band of frequencies is shown to be substantially within the limits of the fine grain power variations.

FIGURE 2C shows the anode voltage waveform that is produced in accordance with the illustrated embodiment of the present invention and which is required to provide leveled output power over the entire band. The start of the waveform 45 corresponds to the highest voltage provided by the sweep rate generator 11 of FIGURE 1. The slope of waveform segment 47 is determined by the setting of the adjustable tap on resistor 17. Diode 19 is forward biased during the sweep time corresponding to the duration of waveform segment 47, and diodes 29 and 33 are held cut off. Break point 49 is produced when diode 19 becomes non-conductive and is therefore determined by the slope of segment 47 and by the voltage set by adjustable resistor 37. The level of waveform segment 51 thus corresponds to the voltage set by resistor 37.

Diode 29, which was back biased during the portion of the cycle corresponding to segments 47 and 51, becomes conductive at point 53 when the output voltage of amplifier 27 is substantially equal to the voltage set by adjustable resistor 37. The slope of waveform segment 55 which is provided by amplifier 27 through diode 29 is determined by the setting of adjustable resistor 23 and by the gain of amplifier 27. When the voltage applied to the input of amplifier 27 increases to a level that is substantially equal to the voltage established by adjustable resistor 31, diode 33 becomes conductive. This causes an abrupt increase 57 in the gain of amplifier 27 as a result of the reduced cathode resistance thus provided. The level at which break point 57 occurs is set by adjustable resistor 31 and the slope of waveform segment 59 is determined by the increased gain of amplifier 27. The anode voltage waveform is then amplified and adjusted to the proper level by the D.-C. amplifier and level adjuster 40 for application to the anode of the backward wave oscillator tube.

Therefore, the circuit of the present invention reduces the total variation in output power of the backward wave oscillator to within the limits of the fine grain power variations of the particular tube used. In addition, the circuit of the present invention provides a plurality of adjustment which can be used to provide an anode voltage waveform particularly suited for minimum power output variations from a given tube.

I claim:

1. A circuit for adjusting the voltage applied to the anode electrode of a backward wave oscillator tube as a function of the voltage applied to the helix electrode thereof, said circuit comprising means to generate an exponentially decaying waveform having a predetermined initial value, said helix electrode connected to receive said waveform, a first cathode follower comprising an adjustable tap cathode resistor connected to receive said waveform, a unidirectional voltage having a value that is substantially equal to the initial value of said waveform, means to apply said unidirectional voltage to said cathode resistor, a variable voltage divider connected to the output of said first cathode follower, a second cathode follower connected to said adjustable tap, a summation node, a first diode, said first diode serving to connect the output of said second cathode follower to said summation node, an amplifier comprising gain degenerating means and input current limiting means in the input circuit thereof connected through said variable voltage divider to the output of said first cathode follower, a second diode connecting the output of said amplifier and said summation node, first and second variable voltage sources, a third diode serving to connect said first variable voltage source to said gain degenerating means and adapted to increase the gain of said amplifier in response to the level of signal applied to the input thereof, means to connect said second variable voltage source to said summation node, and means to amplify within predetermined voltage levels the signal appearing at said summation node, said means to amplify serving to connect said summation node to said anode electrode.

2. A circuit according to claim 1 wherein the maximum value of said second variable voltage source is substantially less than the initial value of said waveform, said first diode is connected to be forward biased at the initial value of said waveform, said second diode is connected to be forward biased when the voltage at the output of said amplifier exceeds the voltage of said second variable voltage source, and said third diode is connected to be forward biased when the voltage applied to the input of said amplifier decays to a value less than the voltage of said first variable voltage source.

References Cited in the file of this patent

UNITED STATES PATENTS 2,760,008 Schade ---------------- Aug. 21, 1956